United States Patent
Chan et al.

(10) Patent No.: US 8,478,127 B2
(45) Date of Patent: Jul. 2, 2013

(54) BURST MODE OPTICAL MEDIA CONVERTER WITH FAST ANALOG CONVERSION

(75) Inventors: Eric Y. Chan, Mercer Island, WA (US); Tuong Kien Truong, Bellevue, WA (US); William Earl Lawrence, Edgewood, WA (US); Clete M. Boldrin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 360 days.

(21) Appl. No.: 12/846,296

(22) Filed: Jul. 29, 2010

(65) Prior Publication Data

US 2012/0027415 A1 Feb. 2, 2012

(51) Int. Cl.
*H04B 10/00* (2006.01)
*H04J 14/00* (2006.01)

(52) U.S. Cl.
USPC .......................................... 398/135; 398/60

(58) Field of Classification Search
USPC .................................... 398/60, 135
See application file for complete search history.

(56) References Cited

U.S. PATENT DOCUMENTS

| | | | | |
|---|---|---|---|---|
| 5,007,699 | A | * | 4/1991 | Stout ............................... 385/46 |
| 5,347,601 | A | * | 9/1994 | Ade et al. .......................... 385/3 |
| 6,151,567 | A | | 11/2000 | Ames et al. |
| 2011/0243566 | A1 | * | 10/2011 | Truong ........................ 398/116 |

FOREIGN PATENT DOCUMENTS

EP 0 282 102 A2 9/1988

OTHER PUBLICATIONS

U.S. Appl. No. 12/752,391, filed Apr. 1, 2010 and entitled: Optical Fiber Interface System and Connector.
U.S. Appl. No. 12/612,968, filed Nov. 5, 2009 and entitled: Transceiver for Plastic Optical Fiber Networks.
Chan, E. et al.; Application of COTS High Power Laser Diodes and Driver for Free Space Laser Communication Terminal; SPIE vol. 3266; pp. 54-67.
Berger, S.J. "ARINC 629 digital communication system—application on the 777 and beyond", Microprocessors and Microsystems, vol. 20, pp. 463-471, 1997.
United Kingdom Search Report issued in Application No. GB 1111369.3, mailed Oct. 27, 2011, 4 pages.

* cited by examiner

*Primary Examiner* — Nathan Curs
(74) *Attorney, Agent, or Firm* — Armstrong Teasdale LLP

(57) ABSTRACT

A media converter for interfacing an optical fiber bus to an electrical interface of an electronic device is described. The media converter includes an interface circuit configured to convert electrical signals received from a transmitting channel of the electrical device in a voltage doublet format to positive logic electrical pulses and convert received electrical signals for application to a receiving channel of the electrical device from positive logic electrical pulses to a voltage doublet format, a DC coupled receiver comprising an optical interface operable for receiving optical signals from the optical fiber data bus, the receiver operable for converting the optical signals to positive logic electrical pulses for application to the interface circuit, a laser diode operable to transmit optical signals onto the optical bus, and a laser diode driver operable for receiving the positive logic electrical pulses from the interface circuit and converting the electrical signals to signals compatible for operating the laser diode.

27 Claims, 14 Drawing Sheets

Coupler Input Front Bus Cable - Waveform Template

Coupler Output To Receive Stub - Waveform Template

BURST MODE OPTICAL MEDIA CONVERTER WITH FAST ANALOG CONVERSION

BACKGROUND

The field of the disclosure relates generally to optical communications, and more specifically, to methods and systems for fast analog conversion using a burst mode optical media converter.

The ARINC 629 data bus in at least one known application uses metal twisted pair electrical bus cables, stub cables, bus terminators and current mode couplers (CMC) mounted on heavy metallic panels. All of these components are bulky, heavy and expensive. Optical communications solutions, such as those that utilize optical fiber as a communications media, are desirable due to the reduced weight. Reduction of weight is nearly always desirable in an aircraft.

One existing solution for implementing an optical fiber data bus incorporates glass optical fibers (GOFs). This system utilizes 850 nm wavelength transmitters and receivers that are packaged individually as a pair, called a Fiber Optic Serial Interface Module (FOSIM). The FOSIM transmitter and receiver have interface electronics to the terminal controller which send and receive electrical signal to and from the FOSIM in Manchester bi-phase format. In the typical aircraft application, these FOSIMs are located inside the various avionics subsystems of the aircraft that utilize the data bus for communications. Often, these avionic subsystems are referred to as Line Replaceable Units (LRUs). Inside the LRU, the FOSIMs are mounted along with the terminal controller on a multilayer 6U (full size) VME circuit card.

The existing solution has a major disadvantage. Using the FOSIMs within an LRU requires modification and re-certification of the LRU. The re-certification process is expensive. There is a strong desire in the aircraft production community to develop an optical data bus, for example, a plastic optical fiber data bus, to replace the current electrical ARINC 629 data bus for future upgrades of such aircraft, though embodiments would not be limited to aircraft applications.

BRIEF DESCRIPTION

In one aspect, a media converter for interfacing an optical fiber data bus to an electrical interface of an electronic device is provided. The media converter includes an interface circuit configured to convert electrical signals received from a transmitting channel of the electrical device in a voltage doublet format to positive logic electrical pulses and convert received electrical signals for application to a receiving channel of the electrical device from positive logic electrical pulses to a voltage doublet format, a DC coupled receiver comprising an optical interface operable for receiving optical signals from the optical fiber data bus, the DC coupled receiver operable for converting the optical signals to positive logic electrical pulses for application to said interface circuit, a laser diode operable to transmit optical signals onto the optical fiber data bus, and a laser diode driver operable for receiving the positive logic electrical pulses from the interface circuit and converting the electrical signals to signals compatible for operating the laser diode.

In another aspect, a method for interfacing an optical fiber data bus to an electrical interface of an electronic device is provided. The method includes converting electrical signals received from the electronic device in a voltage doublet format to a positive logic format compatible for operating a laser diode, transmitting optical signals from the laser diode to the optical fiber data bus, receiving optical signals from the optical fiber data bus, converting the received optical signals to electrical signals, the electrical signals in a positive logic format, and converting the positive logic formatted electrical signals to voltage doublet formatted electrical signals for application to the electronic device.

The features, functions, and advantages that have been discussed can be achieved independently in various embodiments or may be combined in yet other embodiments further details of which can be seen with reference to the following description and drawings.

DETAILED DESCRIPTION

The embodiments described herein relate to a high-power burst-mode optical media converter using fast analog conversion for a high node-count data bus. An example of such a bus is the ARINC 629 data bus. More specifically, the described embodiments enable the implementation of an optical media converter which meets the high optical power budget requirements (e.g., 46 dBm peak) for a POF (plastic optical fiber) data bus which complies with ARINC 629 protocol specifications. The optical media converter provides fast analog conversion of the burst mode data between the SIM (serial interface module) in the LRU (line replaceable module) and the POF transmitter and receiver (or transceiver) which sends and receives optical signals in the POF data bus.

Figure 1:
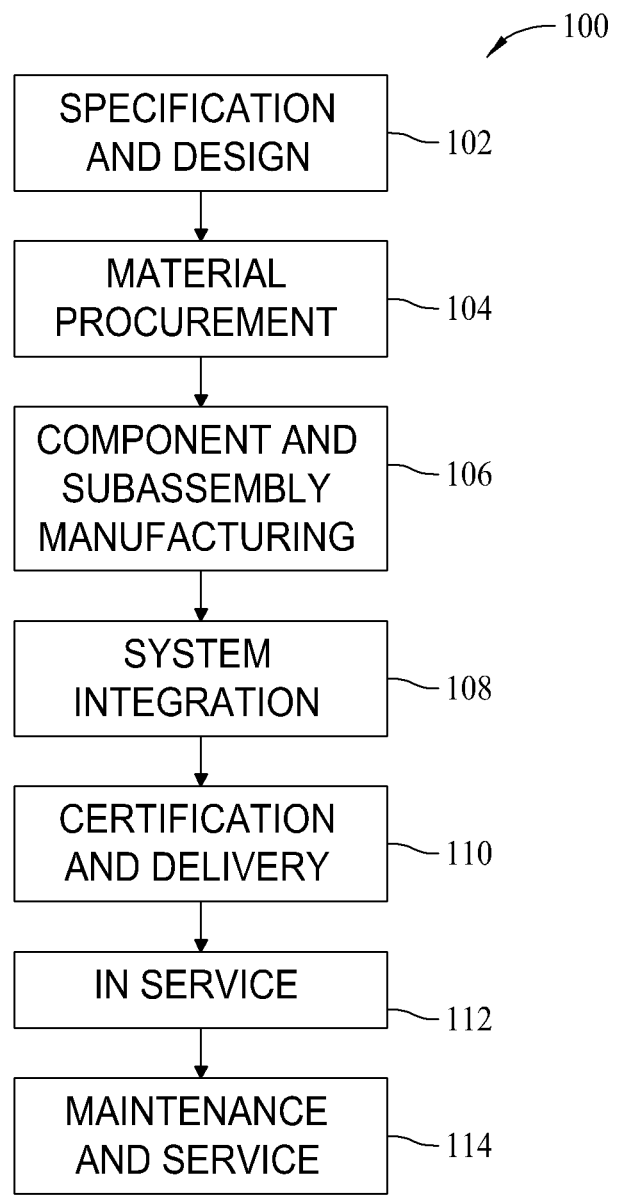
FIG. 1 is a flow diagram of an aircraft production and service methodology.
Figure 2:
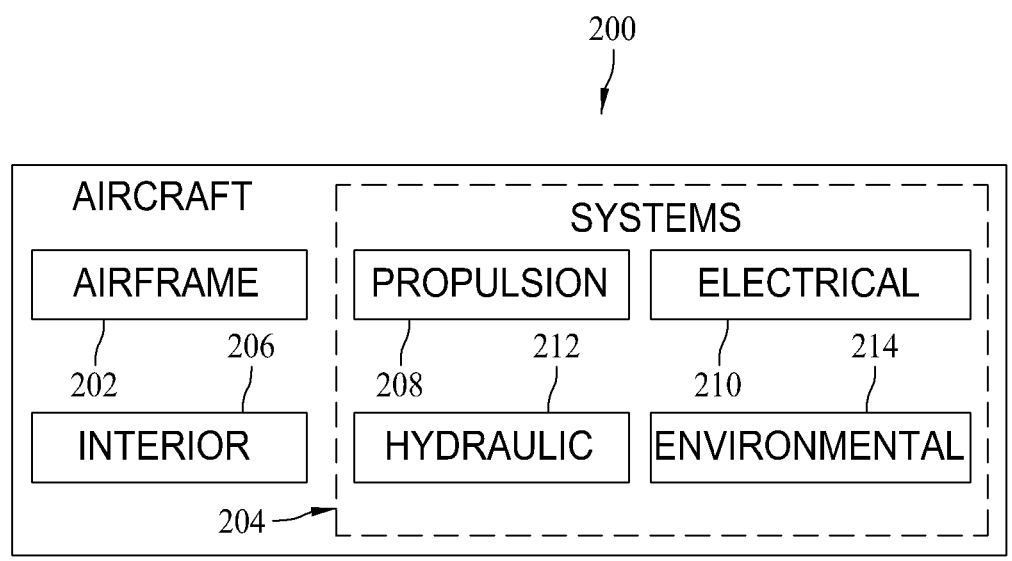
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
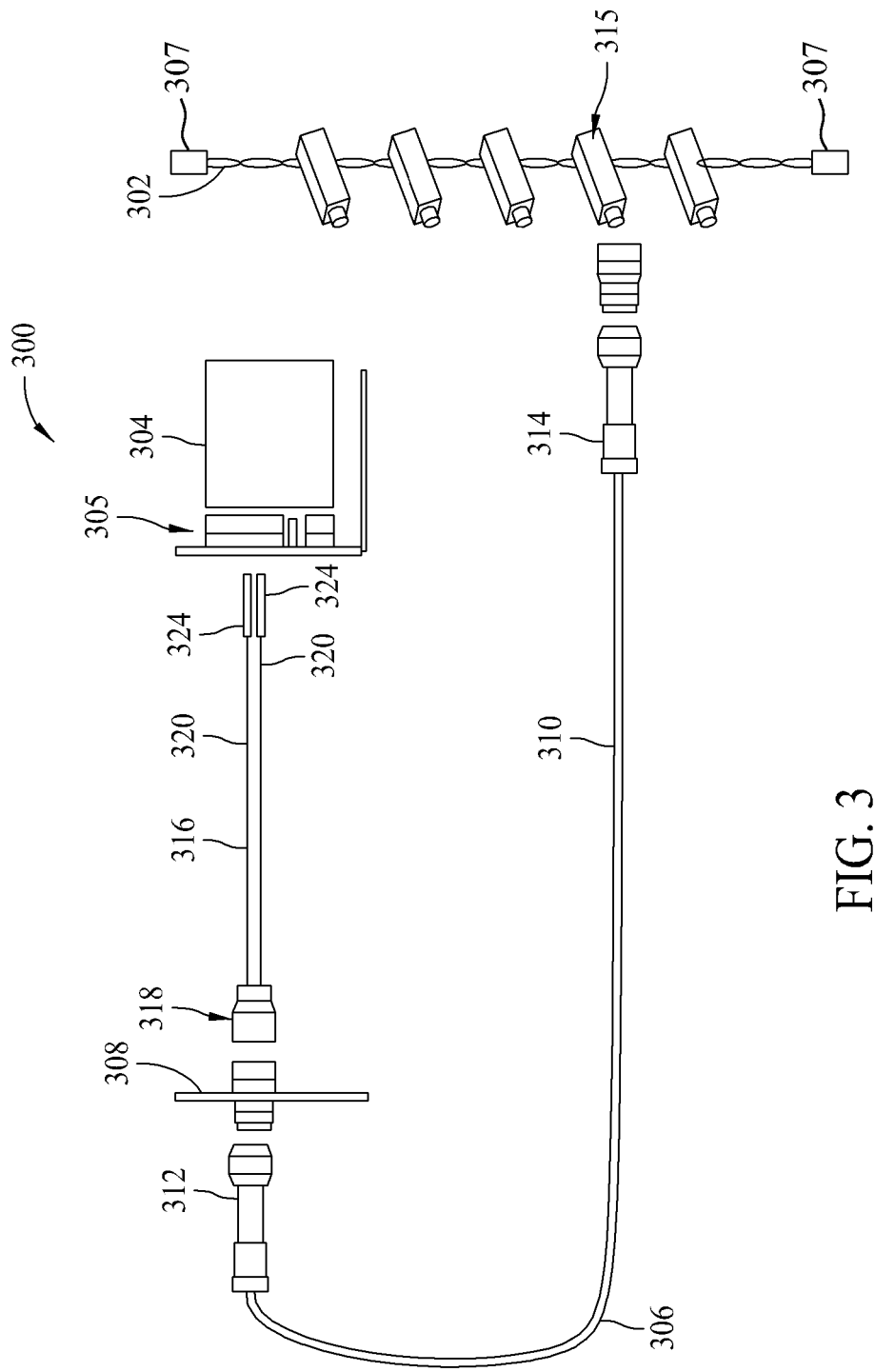
FIG. 3 is a diagram of the components of a system that incorporates an electrical (wire-based) ARINC 629 data bus.

Turning now to FIG. 3, the system and components that are installed in one current aircraft are shown. More specifically, FIG. 3 is a diagram 300 of the components of a system that incorporates an electrical ARINC 629 data bus. In adding a system (LRU) to the data bus, an interconnection from the data bus 302 to the LRU 304, via current mode coupler (CMC) 315 and connector 305 must be made. A data bus cable 306 extends from the data bus 302, which is terminated at each end by a data bus terminator 307, to a stanchion disconnect 308. This stub cable 306 is, in embodiments, a four conductor shielded cable 310 terminated at each end by a stub cable connector 312, 314. A stub cable 316 extends from the stanchion disconnect 308 to the LRU 304. The stub cable 316 includes a connector 318 that connects to the stanchion disconnect 308 and multiple twisted shielded pair wires 320 which extend from connector 318 to LRU 304. The shielded pair wires 320 are connected to the LRU 304 using twinax contacts 324. Metal twisted pair electrical bus cables, contacts, stub cables, bus terminators, connectors, and current mode couplers (CMC) are traditionally mounted on heavy metallic panels. All of these components are bulky, heavy and expensive. As mentioned above, the described embodiments provide a solution to fabricate a media converter for an ARINC 629 data bus which meets the high optical power budget and burst mode requirements associated with the ARINC 629 data bus topology.

Figure 4:
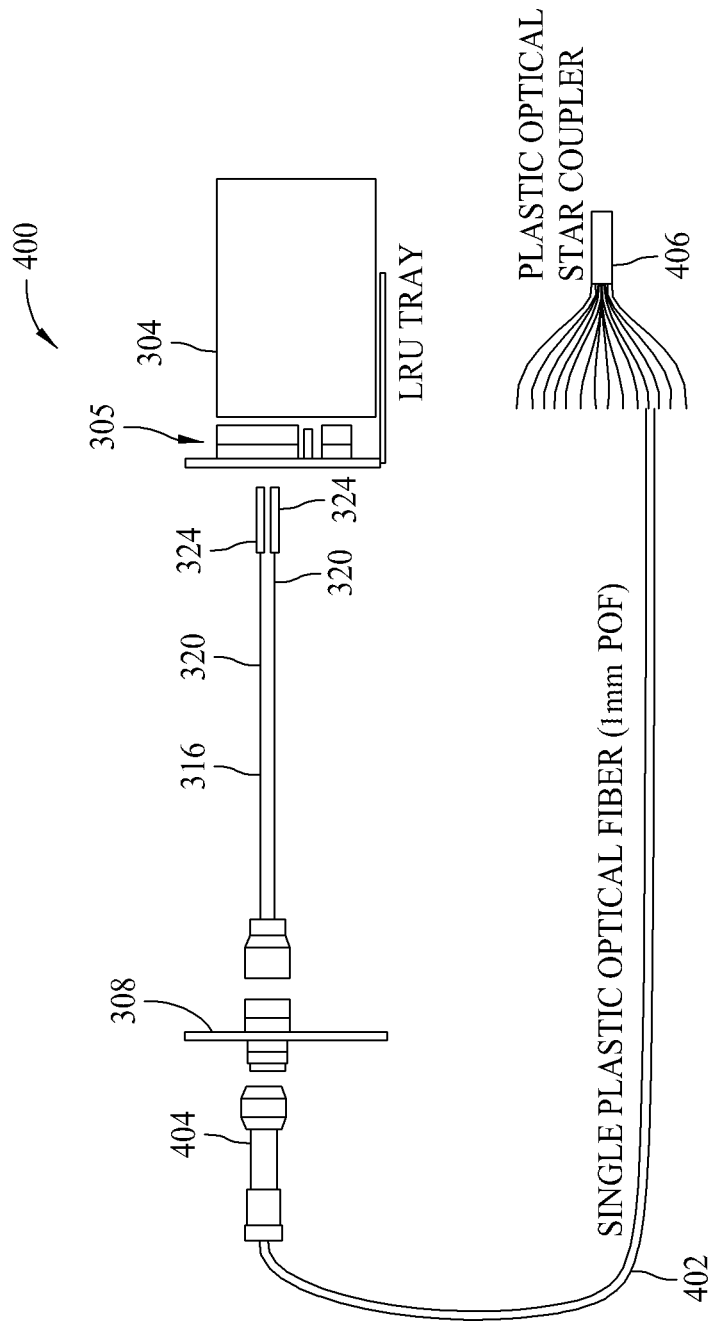
FIG. 4 is a diagram of the components of a system that incorporates an optical ARINC 629 data bus.

FIG. 4 is a diagram 400 of the components of a system that incorporates an optical ARINC 629 data bus. Components in diagram 400 that are the same as in diagram 300 are shown with the same reference numerals. An optical fiber (e.g., a plastic optical fiber (POF)) 402 extends from a connector body 404 that engages stanchion disconnect 308 to an optical star coupler 406. Connector body 404 includes a media converter (not shown in FIG. 4) disposed therein for the conversion of electrical signals to optical signals and vice-versa. The media converter will be described in detail in subsequent paragraphs.

As is shown in FIGS. 3 and 4, all the hardware from the stanchion disconnect 308 to the LRU 304 remains the same, including stub cables 316, twinax contacts 324, and the connector 305 of the LRU 304 which contains a serial interface module.

Figure 5:
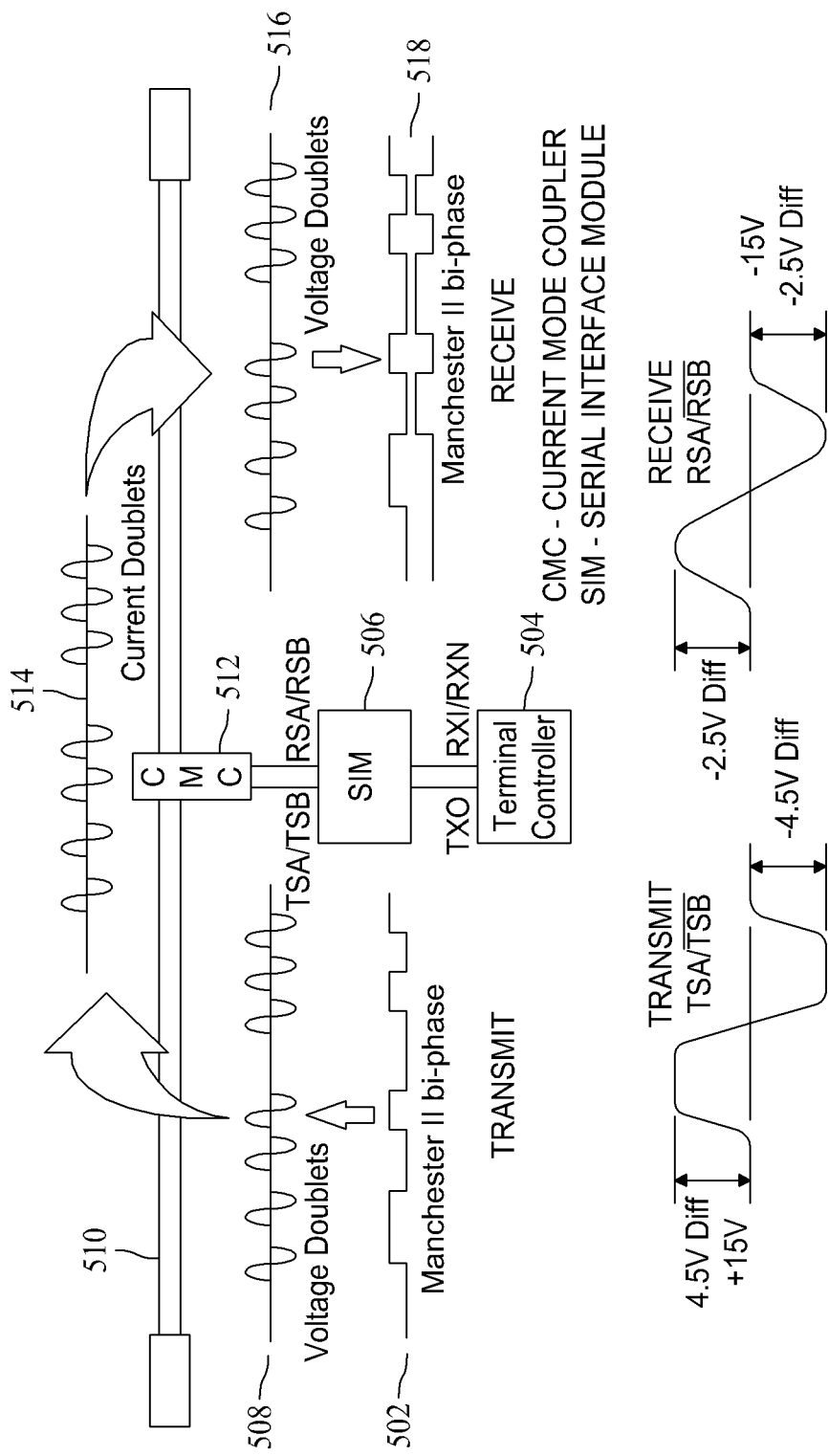
FIG. 5 is a diagram that illustrates the ARINC 629 signals in Manchester format and in voltage doublet format.

In the ARINC 629 POF data bus example of FIG. 4, and as mentioned above, a POF media converter at the stanchion disconnect panel 308 converts the electrical signal (in the form of electrical voltage doublets) from serial interface modules (SIMs) in the LRU 304 to an optical signal. The optical signal is transmitted through a plastic fiber optical fiber 402 to a remote star coupler 406. In operation, the optical signals that pass through the remote star coupler 406 are detected by receivers in other media converters (not shown) that are connected to the coupler 406, thereby forming the data bus. These receivers convert the optical signals back to electrical voltage doublets which are sent back to the receiving channels of the SIM in the LRU. The technical challenges in converting these ARINC 629 electrical data pulses to optical signal (and vise versa) are:

1. The ARINC 629 electrical data pulses in doublets from the SIM are burst mode with long strings of repeated "1" or "0" sequence without any preamble bit sequence, furthermore, these burst mode data patterns are interleaved with long idle time where no data signal transmission occurs. FIG. 5 shows the transmission of an ARINC 629 signal 502 from the terminal controller portion 504 of an LRU (e.g., LRU 304). Signal 502 is in Manchester format which is applied to a serial interface module (SIM) 506. The output signal 508 from the SIM 506 in the voltage doublet format is applied to the electrical data bus 510 where a current mode coupler 512 converts the output signal 508 from the SIM 506 in the voltage doublet format to a current doublet signal 514. In regard to receiving, the current doublet signal 514 from electrical data bus 510 is received at a separate current mode coupler similar to 512 and converted back into a voltage doublet signal 516 for application to the corresponding SIM 506. The SIM 506 converts the voltage doublet signal 516 to a Manchester bi phase signal 518 for reception by the terminal controller portion 504 of a corresponding LRU for processing.

2. Plastic optical fiber has attenuation of about 0.2 dB/m at a 650 nm wavelength. As such, for a long data bus with 75 meters round trip distance, the signal loss on the POF is about 15 dB. Using a large 48-port POF star coupler architecture (as figuratively indicated by coupler 406 in FIG. 4) introduces at least 20 dB loss for each node on the data bus. Including connectors and safety margin, a minimum of 46 dB peak optical power budget is required.

3. The transmitter and receiver in the media converter have to operate in a wide temperature range from −40° C. to 85° C. and along with other harsh avionics environmental conditions.

In regard to the high optical power requirement, a POF implementation of an ARINC 629 data bus requires a media converter to provide a minimum of 46 dB peak optical power budget. A burst mode media converter design which meets this minimum 46 dB power budget requirement is described in the following paragraphs. The burst mode media converter also meets the extreme operating temperature and environmental requirements of a commercial aircraft.

Figure 6:
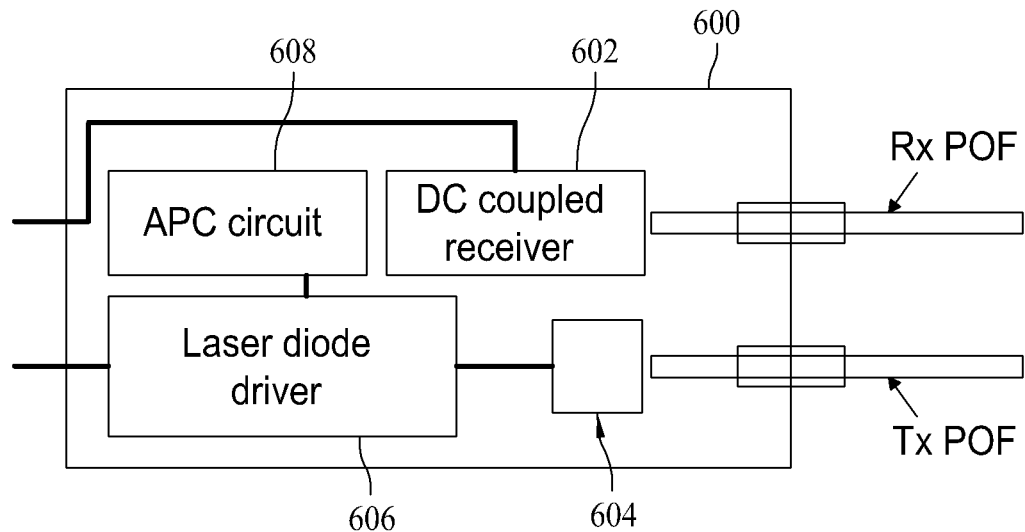
FIG. 6 is a block diagram illustrating the transceiver for a plastic optical fiber media converter incorporating a dual fiber interface.

In the embodiments described herein, the technical challenges referenced above are addressed by a media converting transceiver 600, shown in FIG. 6, which incorporates a DC coupled receiver 602, a laser diode 604, a laser diode driver 606, and an automatic power control 608. DC coupled receiver 602 can respond to an instant change in signal amplitude after a long period of constant signal level or after a long period of idle time. As compared to AC coupled receivers, DC coupled receivers are much lower (worse) in sensitivity because DC coupled receivers do not have capacitors at the receiver input to filter out the low frequency noise components embedded in the data signal.

An example of a commercially available POF DC coupled receiver is the model HFBR-2528 receiver from Hewlett Packard (currently Avago). This DC coupled POF receiver is relatively low in cost and has a wide operating temperature range, as required in the aircraft environment. This DC coupled POF receiver has typically −23 dBm peak optical power sensitivity; to meet the 46 dB link budget requirement; therefore, a transmitter with POF peak coupled power of about 23 dBm (or 200 mW) is required. Using an LED or VCSEL (vertical Cavity Emitting laser) based transmitter, it is difficult to generate 23 dBm in optical power into a POF because of the limit in quantum efficiency for LEDs and VCSELs. However, an edge emitting laser diode has a much higher efficiency in providing 23 dBm of coupled power to a POF.

In one embodiment, a red laser diode, such as one utilized in the CD-ROM, music CD, and DVD industries, is utilized for the ARINC 629 POF transmitter (laser diode 604). The red CD laser diode is low cost and widely available because of the large volume demand in the CD and DVD markets. A data pattern with a long idle time and a long period of low data pulses is well matched to the red CD laser's lifetime and operating temperature characteristics. In a specific embodiment, the red laser diode used is the model HL6545MG laser diode from Opnext (formerly Hitachi). Such a laser diode device structure has a well established reliability in the fiber optic communication industry. Similar laser diodes from other optoelectronic component suppliers would be acceptable if test results show equivalent optoelectronic characteristics.

In one test, the HL6545MG red laser diode required about 250 mA to produce 23 dBm peak coupled output power. As such a high speed and high current driver is needed to operate the laser diode 604. An example of laser diode driver 606 is a Hytek 6510 laser diode driver, which incorporates an emitter coupled logic (ECL) input interface. Embodiments of laser diode driver 606 include an impedance "back matching" design which eliminates the need of a series resistor for impedance matching of the laser diode 604 to the laser diode driver 606, simplifying the transmitter layout. Also without a series resistor between the laser driver and the laser diode, the heating of the laser diode during the laser on time is eliminated, this increases the laser diode life time and output power. Embodiments of laser diode driver 606 can provide modulation current up to 400 mA to the laser diode 604 with data rates up to 600 Mb/s. For an ARINC 629 data bus, the data rate is about 4 Mb/s. Therefore, using the laser diode driver 606 to drive the laser diode 604 forms a transmitter that can couple 23 dBm of peak optical signal to a POF. In an alternative embodiment, laser diode driver 606 is a laser driver integrated circuit LMH6526/6526 from National Semiconductor which can provide up to 600 mA modulation current to the laser diode 604. Other laser diode driver embodiments with similar specifications are contemplated.

Figure 7:
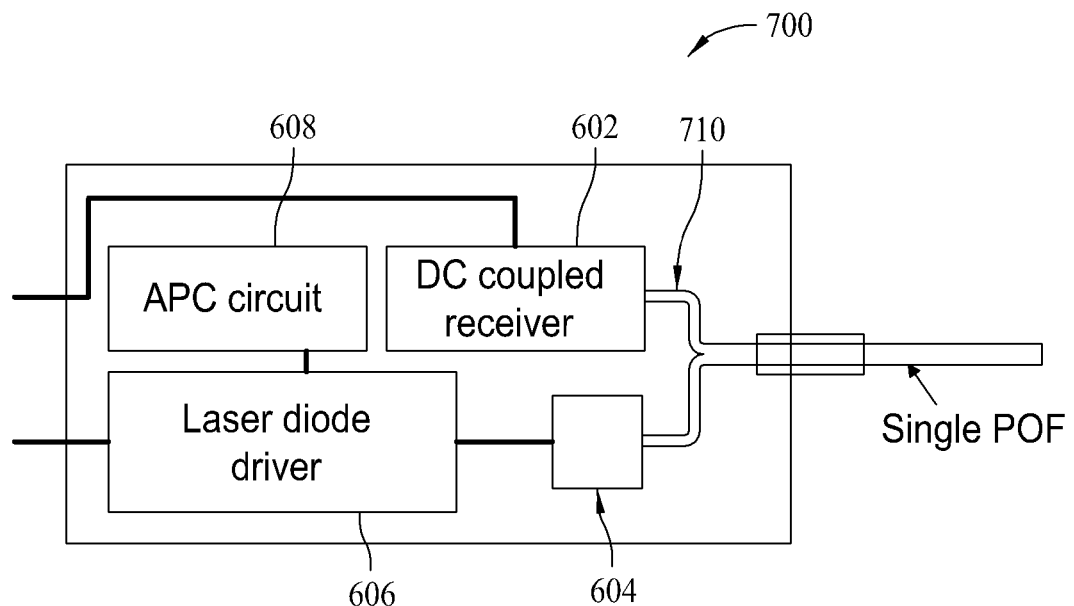
FIG. 7 is a block diagram illustrating the transceiver for a plastic optical fiber media converter incorporating a single bi-directional fiber interface.

FIG. 6 is a block diagram illustrating a media converter transceiver 600 incorporating a dual fiber interface. The media converting transceiver 600, which consists of a transmitter and a receiver, is operable to transmit and/or receive optical signal for the ARINC 629 communications. The transmitter portion consists of the laser diode 604, a laser diode driver 606, and an automatic power control (APC) 608 which are assembled in a housing with good thermal heat sinking The function of the APC is to stabilize the output power of the laser over the operation temperature of the media converter in various avionics systems. One packaging configuration for the converter is described in the paragraphs below relating to FIG. 13A-13C. For a bi-directional (bidi) POF implementation of the ARINC 629 POF data bus, as shown in FIG. 7, a media converter transceiver 700 includes a POF Y-junction coupler 710 is used at the front-end of the transmitter and receiver (transceiver). All other components of media converting transceiver 700 are the same as those of media converting transceiver 600.

The laser diode driver 606 is a relatively low cost component used in the satellite laser communication industry, and as such it has well established reliability and is well known for its unique Gallium Arsenide circuit design for high power and high speed laser driver applications. The combination of laser diode driver 606 and laser diode 604 form a transmitter with POF coupled peak output power of 23 dBm, and using the low cost DC coupled POF receiver with −23 dBm sensitivity, the POF ARINC 629 data bus is provided with an optical power budget of 46 (23+23) dB, meeting the requirement of a central transmissive plastic optical fiber (POF) star topology.

In alternative embodiments, other high power laser diodes, for example those that are blue or green in color also work well with the laser diode driver 606. More specifically, diodes with a wavelength of about 405 nm in wavelength or about 500 nm in wavelength will work with driver 606, though laser diodes of other wavelengths that may be developed are contemplated to work with driver 606. Due to their lower attenuation in POF fiber, blue and green lasers are a satisfactory alternative to red lasers if their output power, cost and temperature performance are compatible with that of the red laser diode.

As such, blue or green high power LEDs can be used in the described embodiments. The high power blue LEDs are widely available from the lighting industry because of the rapid development of high power white LED for illumination applications. The laser diode drive 606 can be used to drive a blue LED, e.g. model XREBLU-L1, from Cree Research, which is a major supplier of LEDs for lighting and decoration applications. With 300 mA modulation current applied to this blue LED, the POF peak coupled power of 9.75 dBm was achieved. The DC coupled receiver 602 at blue wavelengths has about −20 dBm sensitivity, and therefore a power budget of about 29.75 (9.75+20) dB is obtained. When blue LED output power and/or receiver sensitivity is improved by about 17 dB, the laser diode driver 606 and blue LED combination is a good alternative transmitter design for an ARINC 629 POF data bus.

For a POF data bus solution to be operable, solutions to the burst mode data interface requirement between the serial interface modules (SIMs) associated with LRU 304 and the media converters described above must be provided. As shown in FIG. 4, the media converter is intended to be external to the LRU 304. For such a configuration to be operable, special circuitry to interface with the electrical signals from the SIM in the LRU 304 to the above mentioned transmitter and receiver is needed. To achieve the goal of not changing the LRU 304, such an interface circuit has to allow the SIM within the LRU 304 to operate the same way as it does when utilizing the electrical twisted pair ARINC 629 data bus.

There are two considerations for such an interface circuit: digital conversion and analog conversion. With regard to digital conversion, the voltage doublet electrical signals (about 80 ns in pulse width) from the output of a SIM transformer must be converted to a Manchester bi-phase signal with 250 ns pulse width to be compatible with the ARINC 629 POF data bus. The return optical signal that is received by the media converter transceiver 600 or 700 is detected by the DC coupled receiver 602 in Manchester format. A digital interface circuit converts the Manchester signal back into voltage doublets such that the LRU 304 receives the same signals as would be received by a twisted pair electrical data bus.

Figure 8:
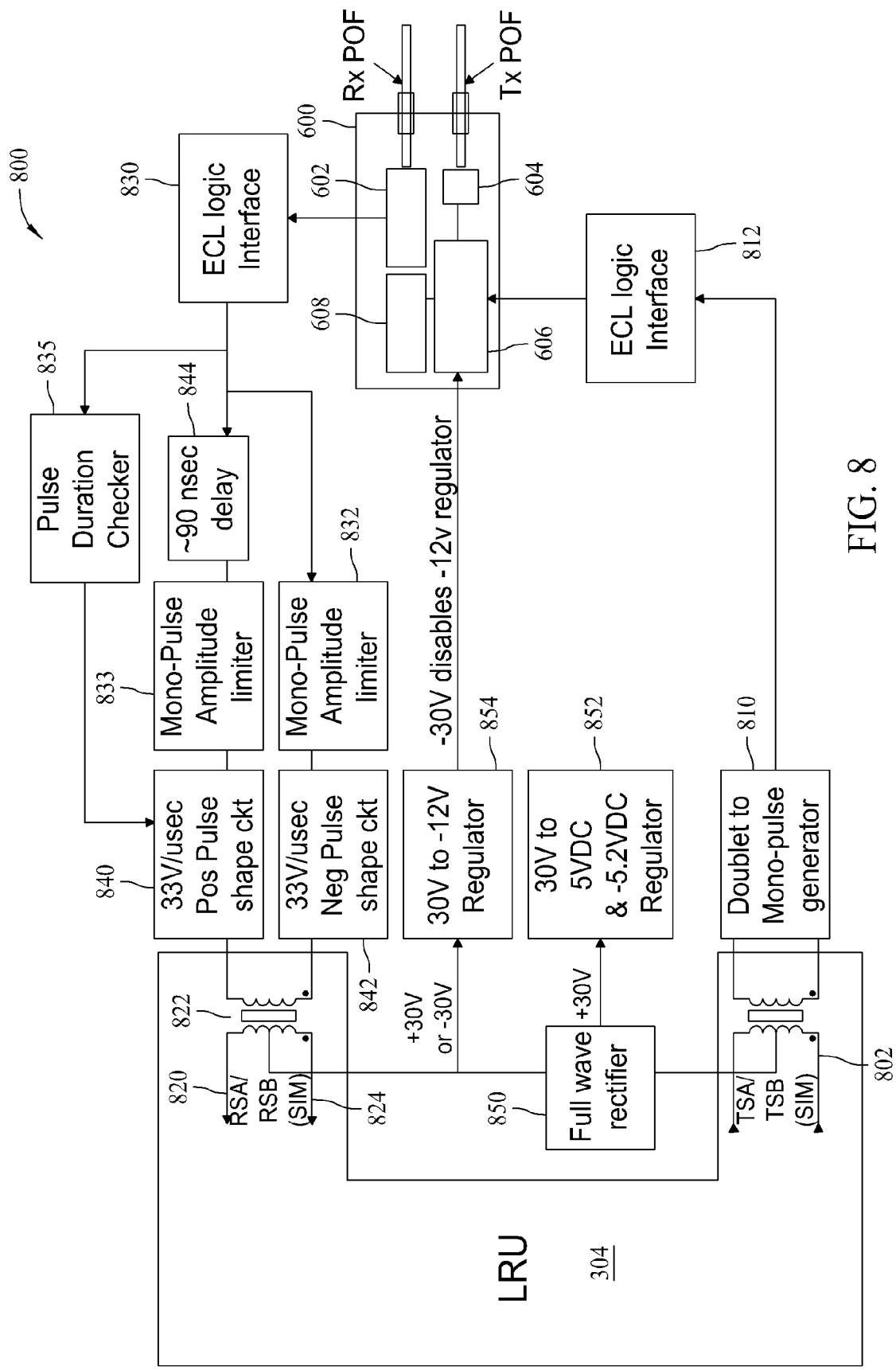
FIG. 8 is a block diagram illustrating an analog interface circuit to a POF transceiver for conversion of voltage doublet signals to positive logic signals and positive logic signals to voltage doublet signals.

FIG. 8 is a block diagram that illustrates an analog conversion approach. Specifically, analog circuit 800 is operable to recognize the voltage doublets from the SIM 802 and receive the positive lobe of the voltage doublet but discard the negative lobe of the voltage doublet using doublet to mono-pulse generator 810, and then driving the laser diode driver 606 with a standardized amplitude pulse of about 78 ns output by ECL logic interface 812. On the receiving side, all received pulses greater than −23 dBm in amplitude are clamped at +/−3 volt and rate limited to +/−33V/microsecond before being fed to the RSA input 820 of SIM transformer 822. The RSB input 824 of the SIM transformer 822 receives the same signal as received by the RSA input 820, though delayed by ~90 ns. The media converter performs a precision timing check on the incoming optical pulse, providing the SIM with the same duration doublet as it would for the returning signals from a twisted wire coupler as described in the following paragraph. If the media converter detects an elongated pulse, indicating a collision on the optical bus, it signals the SIM by not sending the positive lobe.

The doublet to mono-pulse generator 810 is triggered by the positive lobe and discards the negative going lobe in the doublet from SIM transformer 802, generating a standardized pulse that turns laser diode 604 on via ECL logic interface 812. With regard to signals received via POF media converter transceiver 600, a TTL to ECL logic interface block 830 passes only those optical pulses whose optical peak power exceeds −23 dBm without retaining any amplitude information, for example, digitizing the mono-pulse. Two mono-pulse amplitude limiters 832 and 833 scale to the precise amplitude needed by the 33V/usec pulse shape circuits 840 and 842. The 90 nsec delay block 844 receives inputs from TTL logic interface 830 and is necessary to re-create the negative, followed by positive, pulse doublet expected at the SIM transformer 822. The pulse shaping circuits 840 and 842 independently adjust the slew rates of the leading and trailing edge of a received pulse to meet the requirements of the ARINC 629 spec. Block 835 monitors the pulse width received from the optical bus and generates a blocking signal if an elongated pulse greater 80 ns is detected. The blocking signal clamps amplifier 840, preventing the SIM from receiving the positive lobe. The SIM will treat this distortion as a grossly invalid doublet. In addition to the signal paths described above, LRU 304 includes two transformers 802 and 822 that provide +30 VDC and −30 VDC power for the transceiver 600. Full wave rectifier 850 and 30VDC to 5VDC and −5.2VDC converter 852 always keeps the receiver portion of transceiver 600 operational. +30VDC to −12V converter 854 disables the POF transmitter portion of transceiver 600 whenever the SIM transformer 822 outputs −30VDC through RSA and RSB.

Figure 9:
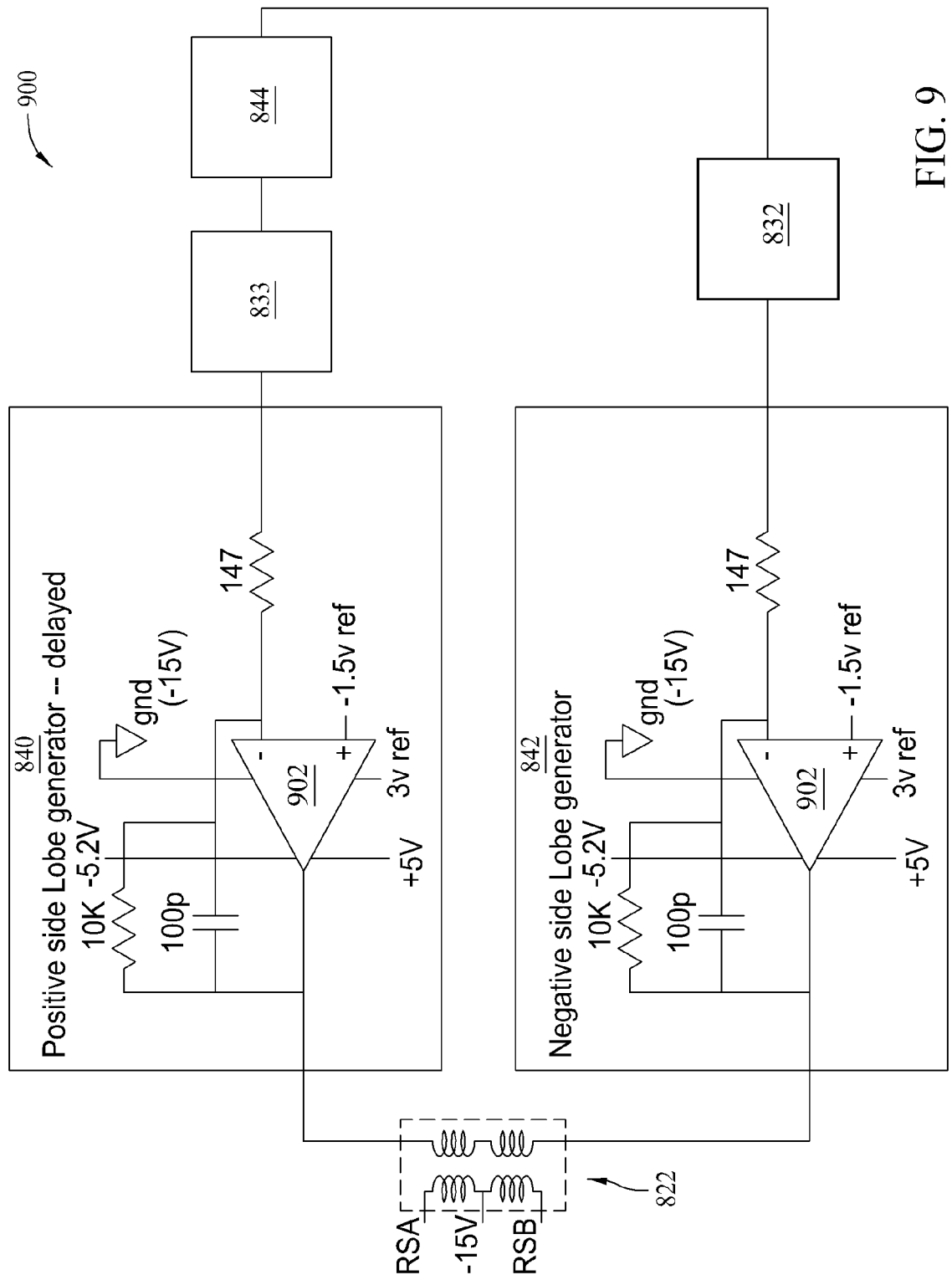
FIG. 9 is a schematic diagram that illustrates one implementation of a pulse shaping circuit.
Figure 10A:
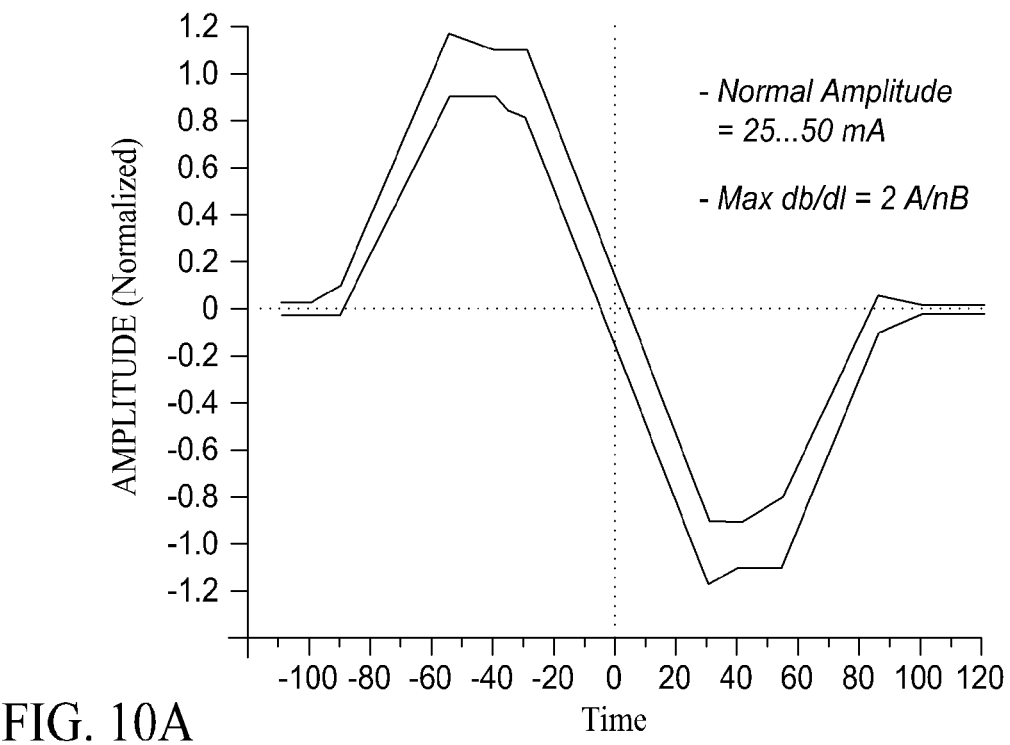
FIGS. 10A and 10B are waveform mask diagrams illustrating the precise wave shaping requirements of ARINC 629 electrical data bus.
Figure 10B:
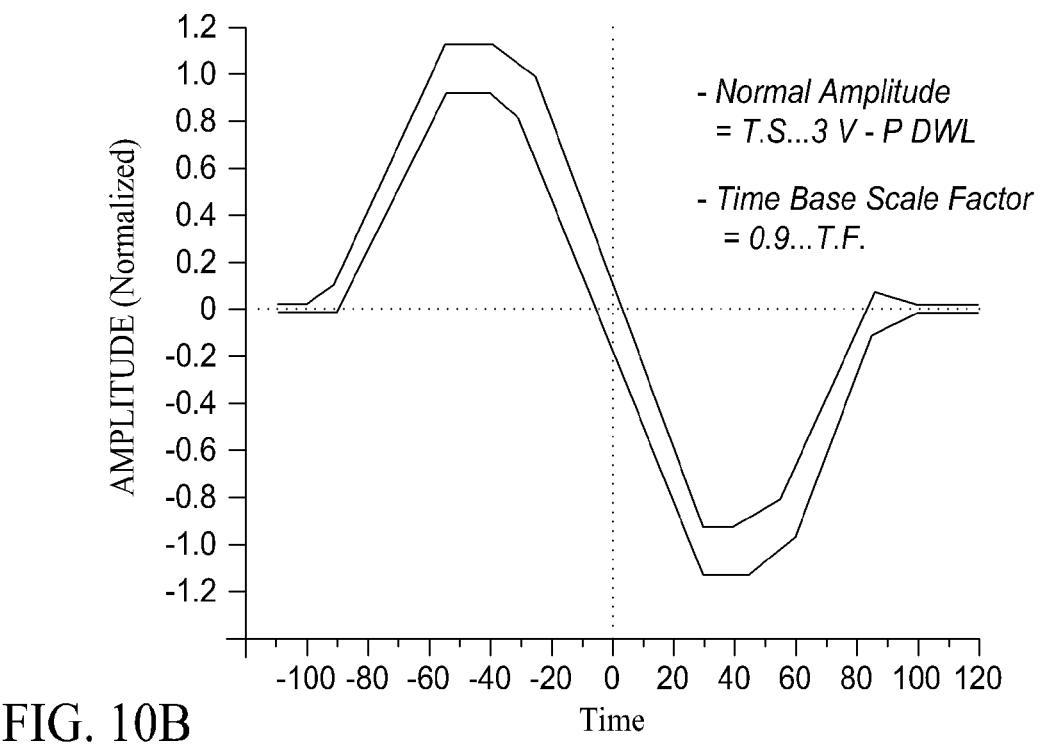

FIG. 9 is a schematic diagram 900 that illustrates one implementation of the 33V/usec pulse shape circuits 840 and 842 illustrated in FIG. 8. The ARINC 629 receiver waveform mask, as shown in FIG. 10B, is so tight that the very fastest voltage limiting operational amplifiers are challenged to meet the precise wave shaping requirements. The circuits of FIG. 9 utilize a voltage limiting fixed gain amplifier 902 to adjust leading and trailing edge slew rates. The SIM transformer 822 converts positive pulses on either end of the primary coil to both positive and negative going pulses on the secondary coil.

In the analog configuration of FIG. 8, a standard pulse width is generated from the optical transmitters (laser diodes) to all of the other terminals in the system connected, for example, to star coupler 406 (shown in FIG. 4. Due to the digital nature of optical pulses, bus contention on the optical bus will be detected by checking the pulse width distortion and/or multiple pulses presence within a 250 ns period where only one pulse is supposed to occur. The signal intensity, due to optical bus topography and optical budget uses a fixed optical intensity threshold. The generation of the receive doublet directly reflects the incoming width of the optical pulse that gets transmitted to the SIM module of the LRU 304. An elongated pulse width of multiple pulses colliding will result in the elongation of the generated doublet or generation of multiple doublets within a single transmission. After the media converter checks pulse duration, the SIM module of the LRU 304 makes the final determination of a valid input signal based on the signal amplitude, minimum pulse width, and period of the received doublet. A collision on the optical bus results in either an invalid voltage doublet waveform or invalid Manchester timing (more than one doublet within a 250 ns period).

Figure 11:
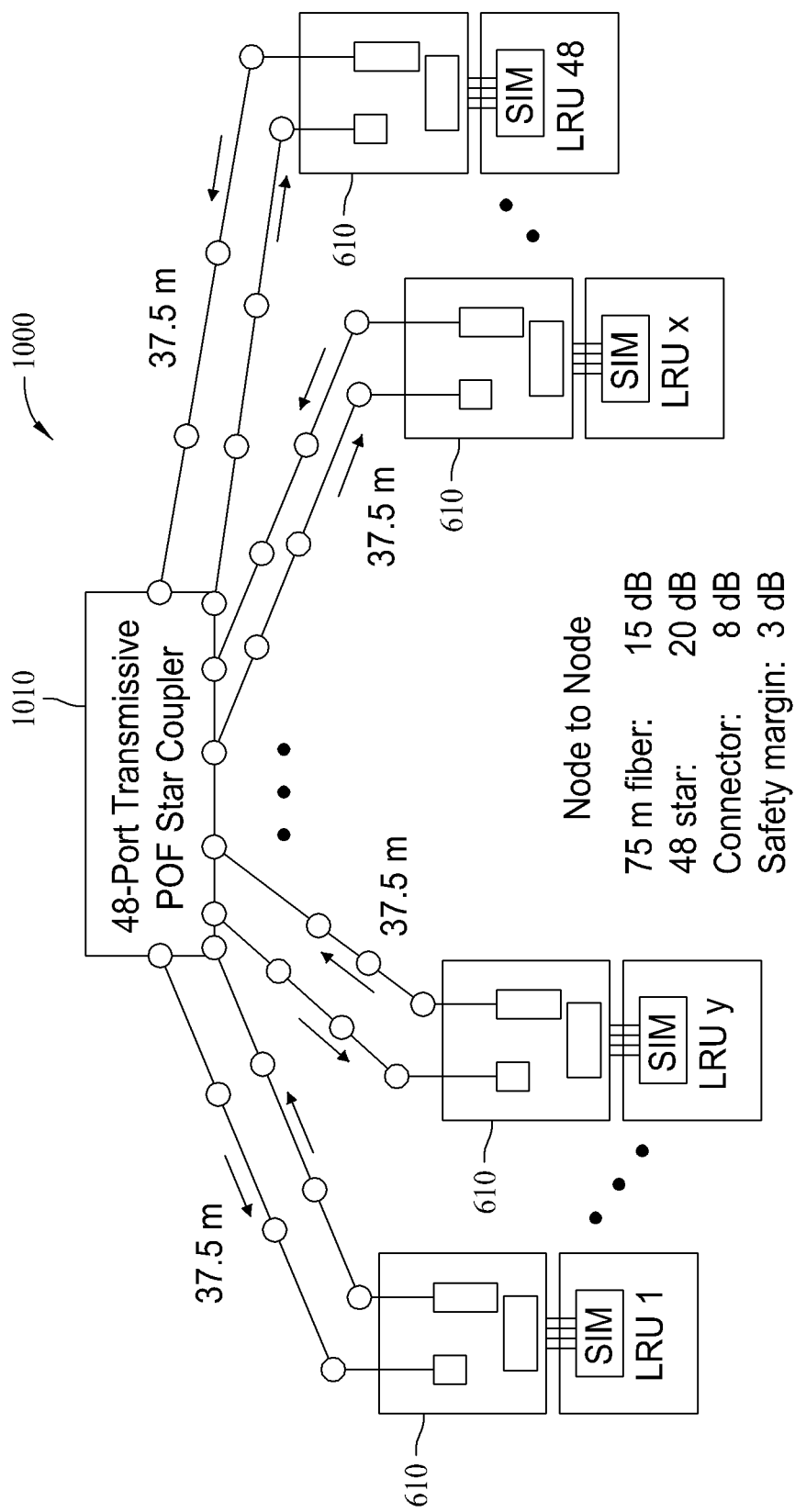
FIG. 11 is an illustration of a 48-Port transmissive star topology that incorporates dual-fiber media converters.
Figure 12:
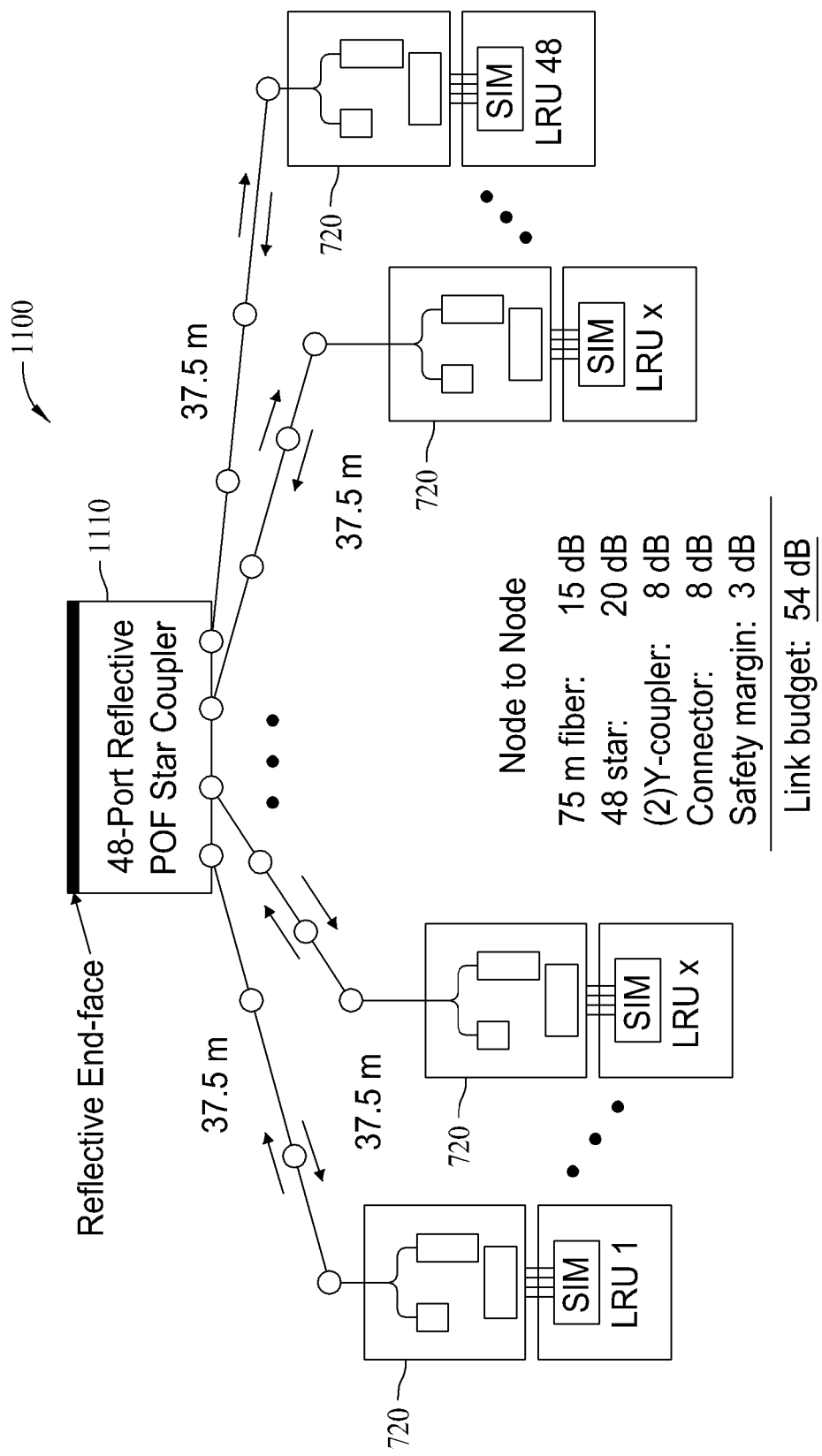
FIG. 12 is an illustration of a 48-Port reflective star topology that incorporates bi-directional (bidi) media converters.

In regard to the above described embodiments, one impetus was to provide an optical bus solution for a 48-node (LRU) ARINC 629 data bus. FIGS. 11 and 12 illustrate two such solutions. Particularly, FIG. 11 is an illustration of a 48-Port transmissive star topology 1000 that incorporates dual-fiber media converters 610, which is the integration of the transceiver of FIG. 6 with interface circuit 800 described with respect to FIG. 8.

In topology 1000, the media converters 610 each have two fibers, one transmits optical signals to a transmissive optical star coupler 1010, while the other receives optical signals from the transmissive optical star coupler 1010. As shown in the link budget calculations in FIG. 11, this topology requires a link power budget of 46 dB, which is met by the components utilized in fabrication of transceiver 600, as described above.

FIG. 12 is an illustration of a 48-Port reflective star topology 1100 which incorporates bi-directional media converters 720 which is integration of interface circuit 800 in FIG. 8 with bidi POF transceiver 700 as shown and described in FIG. 7. In topology 1100, the media converters 720 have one fiber for both transmitting and receiving of optical signals and implemented with the POF Y-junction couplers 710 for communication with the transmitter and receiver portions of the converter 720. However, POF Y-junction couplers 710 add additional insertion loss to the POF data bus. As shown in the calculations within FIG. 12, the reflective star topology 1100 requires a minimum of 54 dB link power budget, about 8 dB higher than the above described transmissive star topology 1000. One approach in solving this problem is to increase the sensitivity of the receiver within transceiver 700 by at least 8 dB, using the so-called "Black Silicon" detector technology. Increasing the receiver sensitivity by 8 dB requires increasing the responsivity of the detector in the receiver by at least 8 dB. Recent technology breakthroughs have shown improvement of silicon responsivity by as much as 20 dB using the "Black Silicon" process. For purposes of this disclosure, an objective is to utilize receivers incorporating "Black Silicon" detectors, in combination with a blue or green laser source, to provide sufficient power budget for implementing this 48-node POF bi-directional reflective-star data bus architecture. The advantages of this reflective star topology 1100 are lowering fiber count by 50% and a star coupler 1110 that is smaller in size that coupler 1010. However, coupler 1110 requires a higher power budget than the coupler 1010 associated with a transmissive star topology 1000.

Figure 13A:
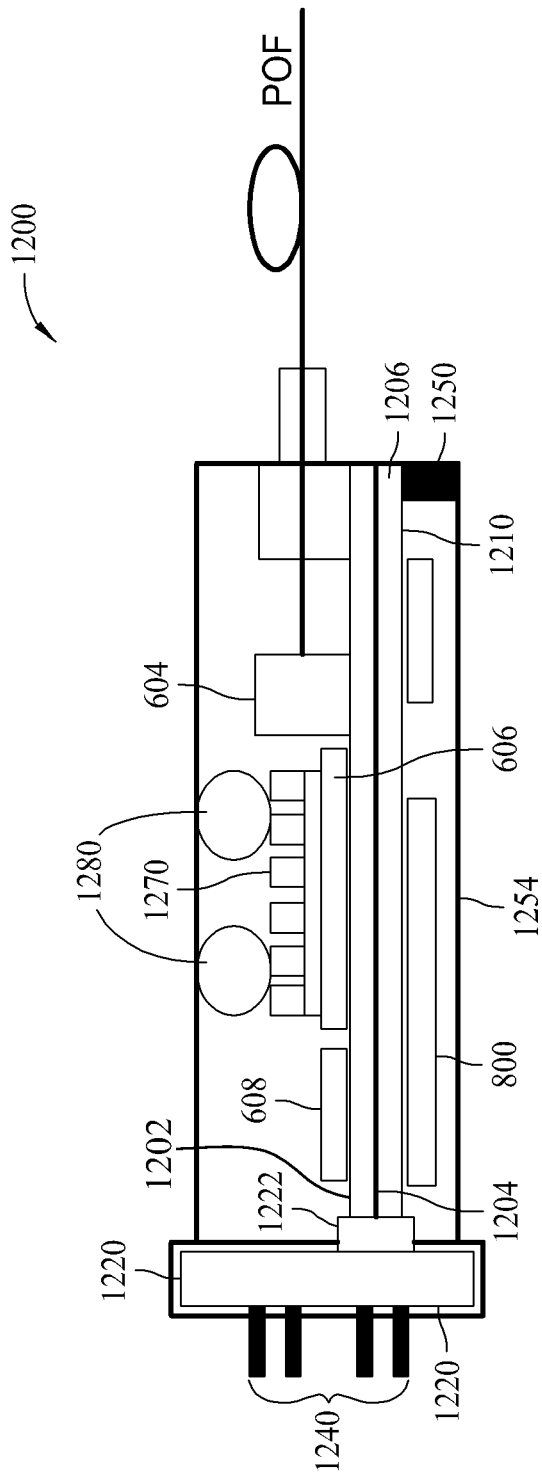
FIGS. 13A-13C are schematic diagrams illustrating packaging of POF media converters in compact cylindrical form, with a connector for mating to the LRU's stub cable connector.
Figure 13B:
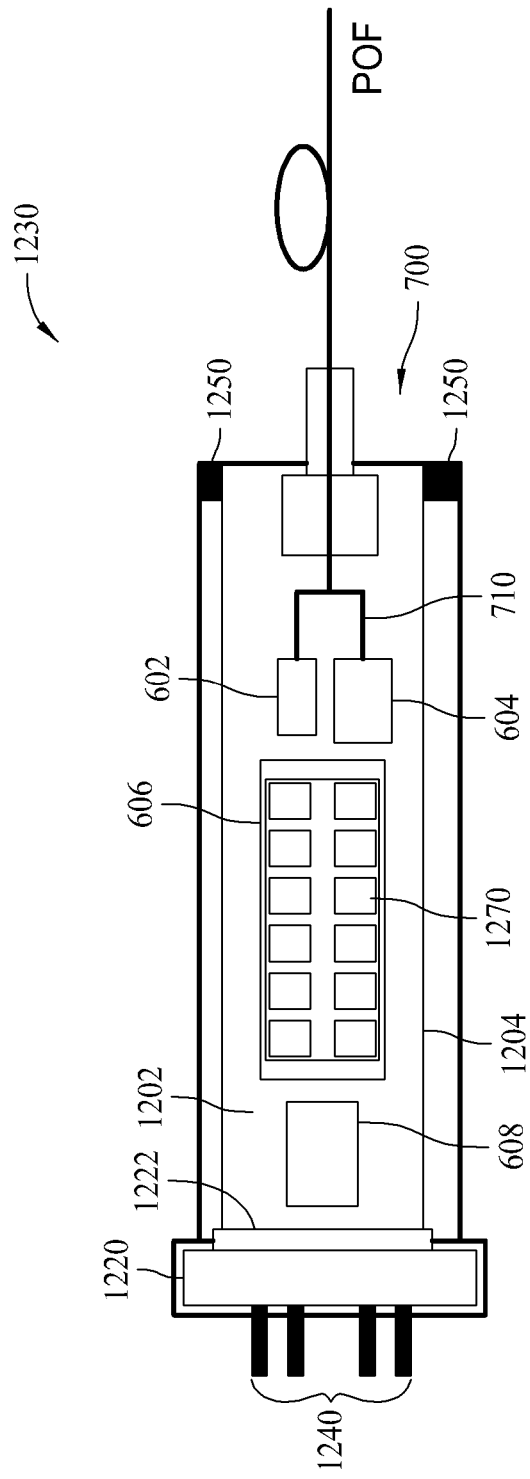
Figure 13C:
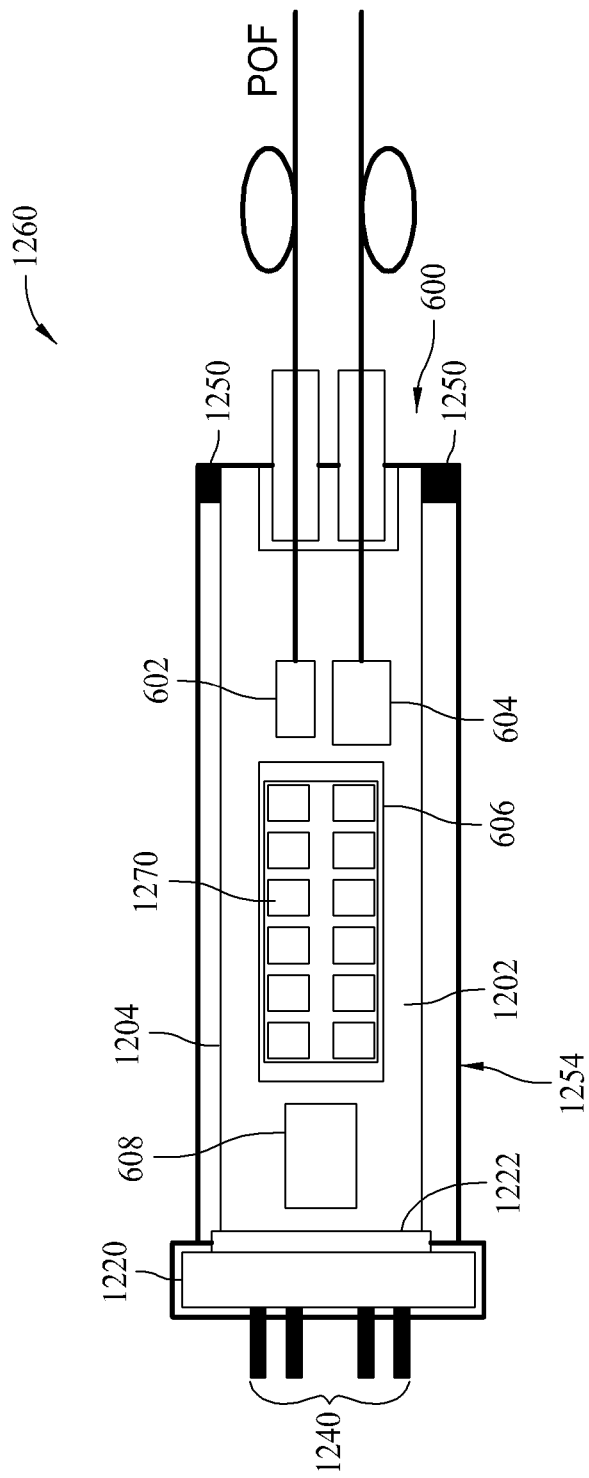

As far as packaging for media converters 610 and 720, such converters are packaged in a rugged metal housing with dimensions and form factor compatible with the size of the circular connector used in the existing LRU interfaces to an ARINC 629 electrical data bus. FIG. 13A is a schematic diagram 1200 illustrating packaging of the POF media converters 610 and 720 in side view. FIG. 13B is a schematic diagram 1230 illustrating packaging of the POF media converter 720 in top view. FIG. 13C is the schematic diagram 1260 illustrating packaging of the POF media converter 610 in top view. FIGS. 13A to 13C constitute a burst mode media converter packaged in a cylindrical package that is about 1 inch in diameter and 3 inches in length with a connector which is identical to the stub cable connector used in the electrical ARINC 629 data bus. This cylindrical package will have either a dual POF pigtail (as shown in FIG. 13C) or a single POF pigtail (as shown in FIG. 13B), depending on the architecture of the POF data bus.

All the transceiver components, such as the APC circuit 608, the laser driver 606, the laser diode 604 and the receiver 602 are mounted on top side 1202 of a horizontal multi-layer printed wiring board (PWB) 1206 with copper heat sink core 1204 to provide proper heat conduction for all the components on the PWB 1204. The interface circuit 800 of FIG. 8 is mounted on the bottom 1210 of the PWB 1206. The PWB 1206 is connected to the circular backplane PWB 1220 by a rugged card edge connector 1222. The four electrical connector pins 1240 are connected by through-holes on the circular backplane PWB 1220 to the interface circuit 800. A ruggedizing support bracket 1250 holds a side of the PWB 1206 is added to the media converter metal package housing 1254 to prevent damage to the PWB 1206 due to vibration. A miniature multi-fin heat sink 1270 is added to the top of the laser driver 606 for efficient heat removal. Flexible heat conducting foam packing material 1280 is added to the top of the heat sink 1270 to conduct heat from the laser driver to the metal package housing 1254 to efficiently remove the heat away from the laser driver 606.

The described embodiments implement an external POF media converter that converts the electrical ARINC 629 data bus to a plastic optical fiber data bus using an analog interface circuit to achieve the smallest conversion latency. The embodiments are implemented without changing any internal component in existing LRUs 304. To provide this compatibility, an end face connector is utilized to interface to the transmitting and receiving channels of the electronic device, the end face connector being compatible with a stub cable connector used in an ARINC 629 electrical data bus.

The described embodiments are operable with an optical data bus in either a dual fiber format or a single fiber format as such embodiments are capable of providing at least 46 dB power to a dual fiber optical data bus and at least 54 dB power to a single fiber optical data bus and therefore are capable of supporting at least a 48-port transmissive plastic optical fiber data bus architecture or a 48-port reflective star plastic optical fiber data bus architecture.

The embodiments provide at least 46 dB peak optical power, which is needed for implementation of a POF ARINC 629 data bus. Such embodiments are lower in cost and are capable of operating reliably in an aircraft environment. As such, such an implementation does not require re-certification of the existing LRU because no change in any component inside the LRU is made. In summary, the described embodiments enable the replacement of the metal (wire) based ARIN629 data bus currently used in many aircraft with a POF based ARINC 629 data bus to reduce size, weight and power.

As understood by the embodiments described herein, either glass optical fiber (GOF) or plastic optical fiber (POF) may be utilized. Variations of GOF and POF such as different core diameter and plastic clad silica (PCS) can be used with proper selection of the operating wavelength, light source and photodetector, all without changing the electrical optical conversion methodologies described herein. Depending on specific requirements, for example, such as future proof of bandwidth, maintenance, and environmental performance, a GOF or POF solution may have distinct advantages over the other. The described embodiments are described in terms of a large core, 1 mm POF, though the descriptions should not be considered to be so limited.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A media converter for interfacing an optical fiber data bus to an electrical interface of an electronic device, said media converter comprising:

an interface circuit configured to convert electrical signals received from a transmitting channel of the electrical device in a voltage doublet format to positive logic electrical pulses and convert received electrical signals for application to a receiving channel of the electrical device from positive logic electrical pulses to a voltage doublet format;

a DC coupled receiver comprising an optical interface operable for receiving optical signals from the optical fiber data bus, said DC coupled receiver operable for converting the optical signals to positive logic electrical pulses for application to said interface circuit;

a laser diode operable to transmit optical signals onto the optical fiber data bus;

a laser diode driver operable for receiving the positive logic electrical pulses from said interface circuit and converting the electrical signals to signals compatible for operating said laser diode; and an automatic power control circuit configured to stabilize output power of said laser diode over an operating temperature range of said media converter.

2. The media converter of claim 1 wherein to convert the electrical signals to signals compatible for operating said laser diode, said laser diode driver converts the electrical signals to current pulses to drive said laser diode.

3. The media converter of claim 1 wherein said interface circuit comprises a circuit operable to convert the positive logic electrical pulses received from said interface circuit to a logic level operable to drive said laser diode driver.

4. The media converter of claim 1 wherein the optical fiber data bus comprises a plastic optical fiber data bus.

5. The media converter of claim 1, wherein for a plastic optical fiber data bus, said media converter further comprises a plastic optical fiber Y-junction coupler operatively connected to said DC coupled receiver and said laser diode, said plastic optical fiber Y-junction coupler comprising a common branch, said common branch operatively connected to the optical fiber data bus to form a bi-directional media converter.

6. The media converter of Claim I wherein said laser diode and said DC coupled receiver are operable at an optical wavelength from about 405 nm to about 650nm.

7. The media converter of claim 1 wherein the operating temperature range is from about −40° C. to about 85° C.

8. The media converter of claim 1 wherein said interface circuit is further configured to:

convert received voltage doublet electrical signals, from the transmitting channel of the electronic device, having about an 80 ns pulse width to Manchester bi-phase signals having about a 250 ns pulse width; and convert Manchester bi-phase signals having about a 250 ns pulse width to voltage doublet electrical signals having about an 80 ns pulse width for application to the receiving channel of the electronic device.

9. The media converter of claim 1 wherein said interface circuit comprises an emitter coupled logic interface, said interface circuit configured to:

recognize the voltage doublet formatted signals from the electronic device;

receive a positive lobe of the voltage doublet formatted signal;

discard a negative lobe of the voltage doublet formatted signal; and drive said laser diode driver with a fixed amplitude pulse of about 80 ns from said ECL logic interface.

10. The media converter of claim 1 wherein said interface circuit is configured to:

voltage clamp all received pulses greater than −23 dBm in amplitude at +/−3V;

rate limit the received pulses to +/−33V/ microsecond prior to input to a first input of the electrical device;

delay the pulses input to the second input by about 80 ns as compared to the pulses input to the first input; and rate limit the received pulses to +/−33V/ microsecond prior to input to a second input of the electrical device.

11. The media converter of claim 1 wherein said interface circuit comprises pulse shaping circuits configured to independently adjust slew rates of leading and trailing edges of a received pulse to meet ARINC 629 specifications.

12. The media converter of claim 11 wherein said pulse shaping circuits each comprise:

a voltage limiting fixed gain amplifier; and a RC lag circuit in series with said voltage limiting fixed gain amplifier to adjust leading and trailing edge slew rates independently.

13. The media converter of claim 1 further comprising an end face connector to interface said interface circuit with the transmitting and receiving channels of the electronic device.

14. The media converter of claim 13 wherein said end face connector is compatible with a stub cable connector used in an ARINC 629 electrical data bus.

15. The media converter of claim 1 wherein said DC coupled receiver and said laser diode are operable with an optical data bus in either a dual fiber format or a single fiber format.

16. The media converter of claim 15, said media converter capable of providing at least 46 dB power budget to a dual fiber optical data bus and at least 54 dB power budget to a single fiber optical data bus.

17. The media converter of claim 15, said media converter capable of supporting at least a 48-port transmissive plastic optical fiber data bus architecture or a 48 port reflective star plastic optical fiber data bus architecture.

18. The media converter of claim 1 comprising an end-face connector, said end-face connector compatible to a stub cable connector used in the electrical ARINC 629 data bus.

19. A method for interfacing an optical fiber data bus to an electrical interface of an electronic device using a media converter, said method comprising:

converting electrical signals received from a transmitting channel of the electronic device in a voltage doublet format to a positive logic format compatible for operating a laser diode;

transmitting optical signals from the laser diode to the optical fiber data bus;

receiving optical signals from the optical fiber data bus;

converting the received optical signals to electrical signals, the electrical signals in a positive logic format;

converting the positive logic formatted electrical signals to voltage doublet formatted electrical signals for application to a receiving channel of the electronic device; and stabilizing output power of the laser diode over an operating temperature range of the media converter.

20. The method according to claim 19 wherein converting electrical signals received from the electronic device comprises utilizing a logic interface to provide inputs to a laser diode driver.

21. The method according to claim 19 wherein the optical fiber data bus is a plastic optical fiber data bus, and wherein transmitting optical signals and receiving optical signals comprises:

interfacing a plastic optical fiber, Y-junction coupler to a DC coupled receiver and the laser diode; and interfacing a common branch of the Y-junction coupler to the plastic optical fiber data bus.

22. The method according to claim 19 wherein transmitting optical signals and receiving optical signals comprises transmitting optical signals and receiving optical signals ranging from about 405 nm to about 650 nm in wavelength.

23. The method according to claim 19 wherein the operating temperature range is about −40° C. to about 85° C.

24. The method according to claim 19 wherein converting electrical signals received from the electronic device in a voltage doublet format to positive logic electrical signals compatible for operating a laser diode comprises:
- receiving a positive lobe of the voltage doublet formatted signal;
- discarding a negative lobe of the voltage doublet formatted signal; and
- driving a laser diode driver with a fixed amplitude pulse of about 80 ns using an ECL logic interface operable to receive the positive lobe.

25. The method according to claim 19 wherein converting the received optical signals to positive logic formatted electrical signals and converting the positive logic formatted electrical signals to voltage doublet formatted electrical signals comprises:
- clamping all received pulses greater than −23 dBm in amplitude at +/−3V;
- rate limiting the received pulses to +/−33V/ microsecond prior to input to a first input of the electrical device;
- rate limiting the received pulses to +/−33V/ microsecond prior to input to a second input of the electrical device; and
- delaying the pulses input to the second input by about 80 ns as compared to the pulses input to the first input.

26. The method according to claim 19 further comprising independently adjusting slew rates of leading and trailing edges of signals associated with received optical pulses to meet an ARINC 629 specification.

27. A media converter for interfacing an optical fiber data bus to an electrical interface of an electronic device, said media converter comprising:
- an interface circuit configured to convert electrical signals received from a transmitting channel of the electrical device in a voltage doublet format having an 80 ns pulse width to Manchester bi-phase signals having a 250 ns pulse width, and convert received electrical signals for application to a receiving channel of the electrical device from Manchester bi-phase signals having a 250 ns pulse width to a voltage doublet format having an 80 ns pulse width;
- a DC coupled receiver comprising an optical interface operable for receiving optical signals from the optical fiber data bus, said DC coupled receiver operable for converting the optical signals to positive logic electrical pulses for application to said interface circuit;
- a laser diode operable to transmit optical signals onto the optical fiber data bus; and
- a laser diode driver operable for receiving the positive logic electrical pulses from said interface circuit and converting the electrical signals to signals compatible for operating said laser diode.

\* \* \* \* \*